United States Patent
Mazur et al.

(10) Patent No.: US 6,463,054 B1
(45) Date of Patent: Oct. 8, 2002

(54) RETRIEVING CELL INFORMATION IN AN OVERLAID CIRCUIT SWITCHED AND PACKET SWITCHED WIRELESS TELECOMMUNICATION NETWORK

(75) Inventors: Sara Mazur, Bromma; Gunnar Thrysin, Linkoping, both of (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/223,636

(22) Filed: Dec. 31, 1998

(51) Int. Cl.[7] ............................................. H04L 12/66
(52) U.S. Cl. ..................... 370/352; 370/328; 370/349
(58) Field of Search ................................. 370/314, 320, 370/321, 322, 328, 329, 330, 331, 332, 336, 337, 347, 348, 349, 352

(56) References Cited

U.S. PATENT DOCUMENTS

| | | | |
|---|---|---|---|
| 5,353,332 A | 10/1994 | Raith et al. | 379/59 |
| 5,396,539 A | 3/1995 | Slekys et al. | 379/59 |
| 5,420,911 A | 5/1995 | Dahlin et al. | 379/59 |
| 5,528,664 A * | 6/1996 | Slekys et al. | 370/329 |
| 5,778,316 A | 7/1998 | Persson et al. | 455/434 |
| 6,157,845 A * | 12/2000 | Henry et al. | 455/553 |
| 6,230,009 B1 * | 5/2001 | Holmes et al. | 455/426 |

FOREIGN PATENT DOCUMENTS

WO   WO95/16330   6/1995
WO   WO97/15167   4/1997

* cited by examiner

*Primary Examiner*—Hassan Kizou
*Assistant Examiner*—Tim Spafford
(74) *Attorney, Agent, or Firm*—Burns, Doane, Swecker & Mathis, L.L.P.

(57) ABSTRACT

A method of obtaining cell specific information for a dual-mode mobile station (MS) operating in an overlaid network operating on different frequency bandwidths and time slot structures such as a combined D-AMPS and EDGE described in the ETSI Enhanced Data Rates for GSM Evolution (EDGE) specification. The combined networks operating on 30 kHz and 200 kHz respectively having a combined circuit switched and packet switched capability. An MS camping in packet mode is able to perform cell selection/reselection on a particular network by scanning and reading the appropriate control channels of the associated network. For example, in a first aspect of the invention, the MS periodically scans both the control channels on the 30 kHz network to read related cell information and the control channels of the 200 kHz network to read related cell information associated therewith. In a second aspect of the invention, the MS scans the 30 kHz control channels to read the cell information and, if cell reselection occurs, then scans the 200 kHz control channels. In a third aspect, the MS scans and reads the 200 kHz control channels for cell information and, in response to a page from the 30 kHz network, scans control channels associated with the 30 kHz network. A fourth aspect includes the situation where both 30 kHz and 200 kHz cells are coordinated. The MS can then scan and read the control channels from either network and obtain a pointer to the control channels of the other network.

22 Claims, 4 Drawing Sheets

RETRIEVING CELL INFORMATION IN AN OVERLAID CIRCUIT SWITCHED AND PACKET SWITCHED WIRELESS TELECOMMUNICATION NETWORK

The present invention relates generally to wireless telecommunication networks. More specifically, the invention relates to techniques for obtaining cell related information in an overlaid network providing circuit switched and packet switched services.

BACKGROUND OF THE INVENTION

The evolution of wireless telecommunication systems has led to continuing improvements in quality, capacity, and added functionality as compared to prior generations. One area of added functionality has been the introduction of packet switched data services such as General Packet Radio Service (GPRS) specified for use with the Global System for Mobile Communications (GSM) wireless standard. The implementation of packet switched services in wireless telecommunications allows for the introduction of a number of new data based services in current generation systems, e.g., enhanced support for Internet communications. Packet switched techniques provide a significant improvement in efficiency for utilizing radio resources relative to conventional circuit switched techniques.

Packet switched connections are an especially suitable means for transmitting data and voice over the air interface since radio resources are only reserved when the data or voice, which are divided into packets, need to be sent. Resources are relinquished and made available to other users during breaks between the packets thereby freeing up radio spectrum during periods of non-use. Further gains in efficiency are achieved by sharing resources among users by having multiple users share the same radio channel, i.e. frequency and time slot. In contrast, conventional circuit switched techniques allocate radio resources for the entire duration of the transmission. A comprehensive description of GPRS and packet data communications is presented in PCT publication WO/9516330 entitled: "Apparatuses and Mobile Stations for Providing Packet Data Communication in Digital TDMA Cellular Systems", published on Jun. 15, 1995 with a priority date of Dec. 10, 1993 and assigned to the present assignee, the disclosure of which is incorporated here by reference. An example in the trend toward wireless evolution has been the development of the Enhanced Data Rates for GSM Evolution (EDGE) which is currently under standardization within the European Telecommunication Standards Institute (ETSI). The EDGE specification has also been selected by the Universal Wireless Communications Consortium (UWCC), as the outdoor high speed data component of UWC-136, which gives a common evolution path for IS-136 Digital Advanced Mobile Phone System (D-AMPS) and GSM to support high-bit-rate wireless data services such as simultaneous voice, internet services, and video at transmission up to speeds of 384 kbps (48 kbps per timeslot).

The EDGE specifications have been developed so as to offer packet data communications at high speeds within current frequency bands and is based on the current GSM Time Division Multiple Access (TDMA) frame structure, logical channel structure and 200 kHz carrier bandwidth. The current GSM and D-AMPS (which air interface standard provides for a 30 kHz carrier bandwidth) installed base stations can be upgraded in a step-wise manner for a gradual evolution to the higher bit rates. This enables systems operating in accordance with both network standards to achieve improved bit-rate performance within current frequency allocations and in existing cell plans.

In an integrated D-AMPS/EDGE network having circuit switched and packet switched functionality, EDGE channels applied in a GPRS network may be overlaid on top of an existing D-AMPS network. For example, the EDGE/GPRS portion of the network may support packet-switched (e.g., data) communications, while the D-AMPS portion of the network may support circuit-switched (e.g., voice or fax) communications. These system portions, however, have different operational characteristics. For example, EDGE, including traffic and control channels, uses a radio interface based on a 200 kHz carrier bandwidth wherein D-AMPS uses 30 kHz carrier bandwidth. Problems can arise from the operation of a dual-mode mobile station (MS) in an overlaid 30 kHz and 200 kHz network.

By way of example, in such a system an idle, dual mode MS typically camps on the packet-switched portion of the network by monitoring the 200 kHz common control channels (PCCCH or CCCH). Thus, an incoming page message for a circuit switched voice call to the MS is normally forwarded by the GPRS network over the PCCCH or CCCH prior to the MS setting up the call on the D-AMPS portion of the system. In the same way, other system related messages, e.g., registration, can be handled through the GPRS network.

Under these circumstances, a problem may arise from the fact that, in overlaid systems, the 200 kHz GPRS defined cells may not necessarily correspond geographically to the 30 kHz cells. Thus there is no way for the MS to know precisely which 30 kHz cell it is in when the page is received, since it has not been monitoring the 30 kHz digital control channels (DCCHs) associated with the circuit-switched portion of the network. Accordingly, the MS does not have the opportunity to obtain the cell specific information necessary for correct communication with the 30 kHz network. This scenario is particularly likely after the MS has moved around between EDGE/GPRS cells thereby increasing the likelihood that the MS may lose track of its current 30 kHz cell location, for example.

The lack of cell specific information associated with such overlaid systems affects a number of processes such as cell selection, cell reselection, and registration (location updating). Cell selection is the process by which the MS selects the most appropriate cell in which it can reliably camp on. Cell reselection is the process by which the MS checks that it is camped on the most appropriate cell and reselects a more appropriate cell when necessary. The most appropriate cell is typically determined by performing signal strength measurements on the serving and neighboring cells such that camping occurs on the cell providing the best radio conditions. However, those skilled in the art will recognize that factors other than signal strength, e.g., different types of service capability, can be considered as part of the process of identifying the most appropriate cell. In this regard, the interested reader is directed to U.S. Pat. No. 5,778,316, entitled "A Method for Communicating in a Wireless Communication System, to Raith et al., the disclosure of which is expressly incorporated here by reference.

Registration is the process by which the MS informs the system of its current geographical location. The cell specific information for the 30 kHz network that is broadcast over the DCCH is required for the registration process, e.g. location updating when roaming, and this information is typically not available to the 200 kHz network. Without accurate cell information regarding the 30 kHz network, MSs camped on the 200 kHz packet switched network will not be able to reliably execute circuit switched calls over the 30 kHz network.

One solution which has been described for dealing with this problem can be found in U.S. Pat. No. 5,353,332 entitled "Method and Apparatus for Communication Control in a Radiotelephone System" to Raith and Muller, the disclosure of which is also incorporated here by reference. In this patent, a control channel can contain both absolute information regarding characteristics of that cell and relative information regarding the characteristics of other, e.g., neighboring cells. This enables, for example, an MS reading that control channel to determine which cell is appropriate for selection or reselection.

However, the techniques described in this latter Raith patent may not be readily employable across different system standards and types of systems, e.g., circuitswitched and packet-switched systems. Thus, it is an objective of the present invention to provide a technique for obtaining the necessary cell information for the reliable operation of an overlaid circuit switched and packet switched network.

SUMMARY

Briefly described, and in accordance with a number of exemplary embodiments thereof, the invention discloses a method of obtaining cell specific information for a dual-mode mobile station (MS) operating in an overlaid 30 kHz and 200 kHz circuit switched and packet switched network. In accordance with a first embodiment of the invention, cell reselection measurements are performed on both 30 kHz and 200 kHz control channels while the MS is camping or in transfer packet mode on the 200 kHz network. For the 200 kHz cell reselection, standard General Packet Radio Service (GPRS) procedures are used to perform measurements on the 200 kHz BCCH carrier. For cell reselection on the 30 kHz network, the MS then tunes to a selected digital control channel DCCH to obtain cell specific information. After completing scans on both networks, the MS is then armed with the information necessary to respond to an incoming page from the 30 kHz network.

In accordance with a second exemplary embodiment, the MS performs a scan and e.g. performs signal strength measurements to select a DCCH on the 30 kHz network exclusively. If a new DCCH is selected, the MS then tunes to the selected DCCH, reads the cell specific information associated with the 30 kHz network and then scans to select a broadcast control channel (BCCH) on the 200 kHz network. The MS tunes to and decodes the selected BCCH to obtain cell specific information. The MS then tunes to and camps on a PCCCH or a CCCH indicated in the cell specific information. In this way, the MS has acquired the necessary information to respond to a page from the 30 kHz network while camping on and being able to respond to a page from the 200 kHz network.

In a third embodiment, the MS scans exclusively the 200 kHz control channels i.e. the BCCH as defined in GSM. When the MS, camped on 200 kHz packet mode, receives a page from the 30 kHz network via the 200 kHz network, it then scans for selecting a DCCH on the 30 kHz network. The MS then reads the associated cell information before responding to the page. Hence, MS is able to obtain all necessary information in order to respond to a incoming page from the 30 kHz as well as from the 200 kHz network.

A fourth embodiment describes an overlaid 30 kHz and 200 kHz network having coordinated cell planning i.e. all cells in the 30 kHz network correspond to those in the 200 kHz network. In this case, cell selection and reselection can be accomplished by scanning the control channels of either the 30 kHz network or 200 kHz network. If, for example, the MS chooses to scan the 30 kHz DCCH, the MS in addition to reading the cell information, also reads a pointer to the 200 kHz BCCH contained on the DCCH. In the reverse case where the MS scans the 200 kHz BCCH, the MS reads the cell information and a pointer to the 30 kHz DCCH.

BRIEF DESCRIPTION OF THE DRAWINGS

The invention, together with further objects and advantages thereof, may best be understood by reference to the following description taken in conjunction with the accompanying drawings in which.

DETAILED DESCRIPTION

Figure 1:
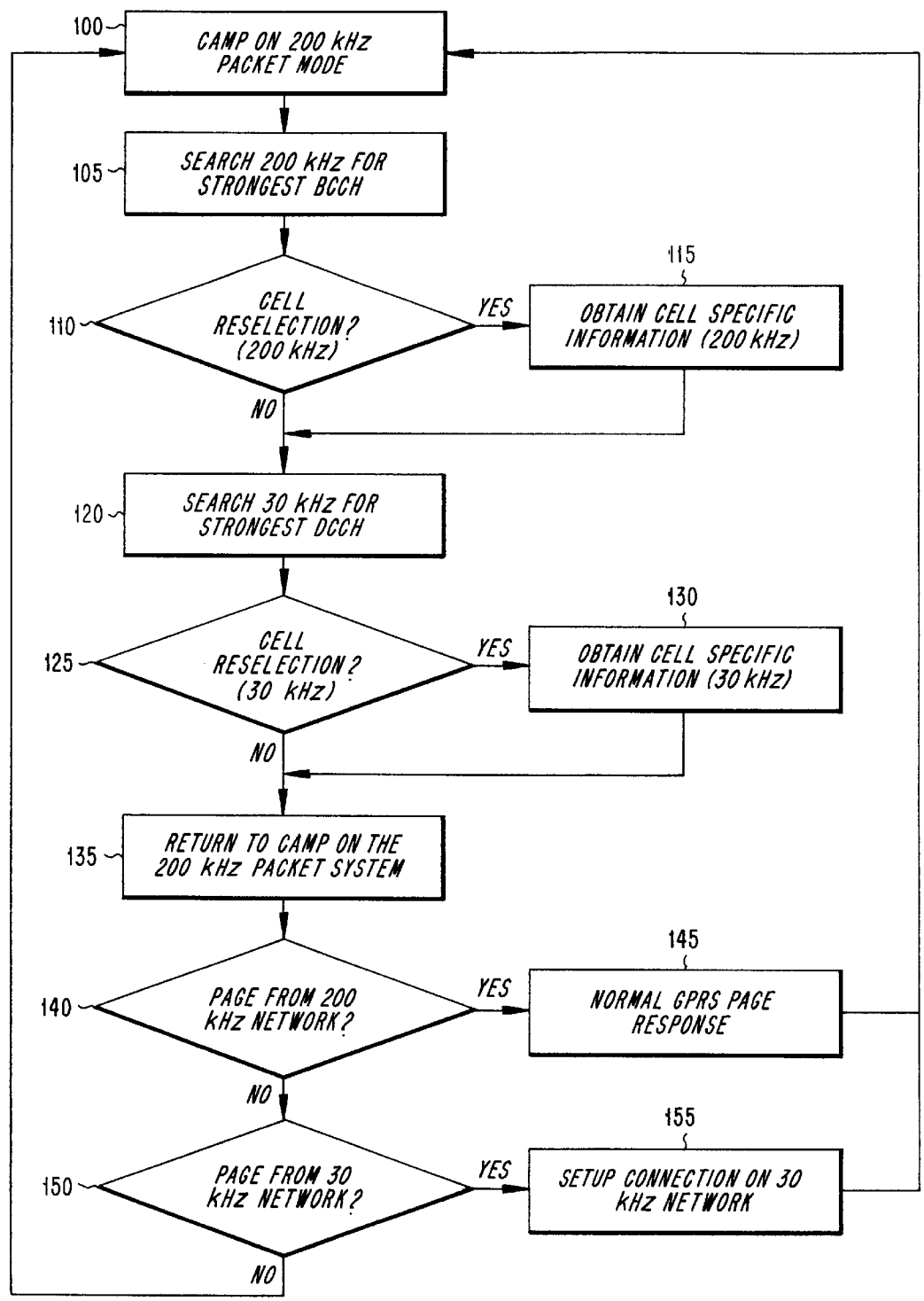
FIG. 1 shows a flow diagram of a process operating in accordance with a first embodiment of the invention.

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

The exemplary radio communication systems discussed herein are described as using the time division multiple access (TDMA) protocol, in which communication between the base station and the mobile terminals is performed over a number of time slots. However, those skilled in the art will appreciate that the concepts disclosed herein find use in other protocols, including, but not limited to, frequency division multiple access (FDMA), code division multiple access (CDMA), or some hybrid of any of the above protocols.

Packet data services, such as General Packet Radio Service (GPRS) implemented for use in Global System for Mobile Communications (GSM) networks, includes support for paging of both circuit switched voice (GSM) and packet switched data (GPRS). This is possible because GSM and GPRS cells are identical and controlled by the same broadcast control channel (BCCH). The mobile station (MS), while camping in packet mode, periodically monitors the GSM broadcast control channels (BCCH) to select a serving cell and to obtain the necessary cell information in order to respond to a circuit switched page. An incoming page for a circuit switched connection is forwarded by the GPRS network to the MS, which is camping in packet mode i.e. monitoring the packet control channels. The present invention addresses the problem of obtaining related cell information by the MS for the reliable coexistence and transition between circuit and packet switched modes of communication in an overlaid 30 kHz/200 kHz system, wherein the cells may or may not be identical.

The GPRS/GSM network can be configured to have the control signaling for packet switched data on either the common control channel (CCCH) or the packet common control channel (PCCCH) e.g. depending on the expected demand of packet data transfer. Accordingly, although the following exemplary embodiments of the invention may refer to the CCCH, the PCCCH or the generic term 'packet control channel' for performing this control signalling, those skilled in the art will appreciate that depending on the configuration of the particular network the most suitable control channel should be used.

In accordance with a first exemplary embodiment of the present invention, reselection measurements are performed on both the 30 kHz and 200 kHz control channels by the mobile station (MS). During camping in packet mode or during an ongoing packet transfer, the MS performs cell reselection on the 200 kHz network using standard General Packet Radio Service (GPRS) procedures associated with the GPRS mobility management system. The GPRS mobility management procedures typically include regular signal strength measurements on the 200 kHz broadcast control channel (BCCH). If cell reselection is required, such as when the signal strength of a neighboring base station (BS) is greater than that of the serving BS, the MS selects a new cell and informs the network. A more detailed description of the standard GPRS cell selection/reselection procedures is included in the ETSI reference TS/SMG-030360Q entitled: "Digital cellular telecommunications system (Phase 2+); General Packet Radio Service (GPRS)"; Service Description GSM 03.60 V5.0.0, the disclosure of which is incorporated here by reference.

On the 30 kHz network, the MS, while camping in packet mode (or connected for packet data transfer) on the 200 kHz packet common control channel (PCCCH), performs cell reselection measurements on neighboring base stations in order to select e.g. the strongest 30 kHz digital control channel (DCCH). If it is determined that a neighboring cell is more suitable, cell reselection procedures are performed by the MS and the MS tunes to and decodes the selected DCCH to obtain the cell specific information. Once the cell information is obtained for the IS-136 30 kHz cell, the MS returns to camping on 200 kHz packet mode and is now armed with the information necessary to respond to an incoming page from the 30 kHz network. In this exemplary, combined D-AMPS/EDGE(GPRS) network, all 30 kHz paging messages, both circuit and packet switched, are forwarded over the 200 kHz GPRS network via the PCCCH.

FIG. 1 shows a flow process operating in accordance with the first embodiment. At step 100, the MS camps in packet mode on the 200 kHz network awaiting a page from the packet system. While camping, the MS performs cell reselection measurements to select a suitable e.g. the strongest broadcast control channel (BCCH) on the 200 kHz network as shown in steps 105 and 110. If a new cell is selected (i.e., other than the currently serving 200 kHz network cell), the MS tunes to and decodes the selected BCCH to obtain cell information via the GPRS standard procedures, as shown in step 115. In step 120, the MS then searches, by performing cell reselection measurements, for e.g. the strongest 30 kHz DCCH. If a new cell is selected in the 30 kHz network (step 125), then the associated control channel is decoded to at step 130 to obtain cell specific information regarding this 30 kHz network cell. The MS returns to camping on the 200 kHz packet control channel following the cell reselection procedures on both networks, as shown in step 135.

In step 140, while camping in packet mode, the MS monitors its assigned paging channel on the 200 kHz network for an incoming circuit switched or packet switched page. If there is a page for a packet switched connection, a normal page response is performed in accordance with standard GPRS procedures, as shown in step 145. After termination of the packet transfer, the MS returns to camping in packet mode, as shown by the return from step 145 to step 100. If a page originates from the 30 kHz network (step 150), the MS switches to the 30 kHz network to proceed to setup the appropriate circuit or packet switched call, at step 155. After termination of the connection on the 30 kHz network, the MS returns to camping in 200 kHz packet mode (step 100).

Since both network control channels are read, the MS obtains all the cell information needed to respond to a page on either network. On the other hand, more power is consumed by the MS in standby mode and more time is taken to perform measurements on the control channels which may cause problems during packet transfer mode.

Figure 2:
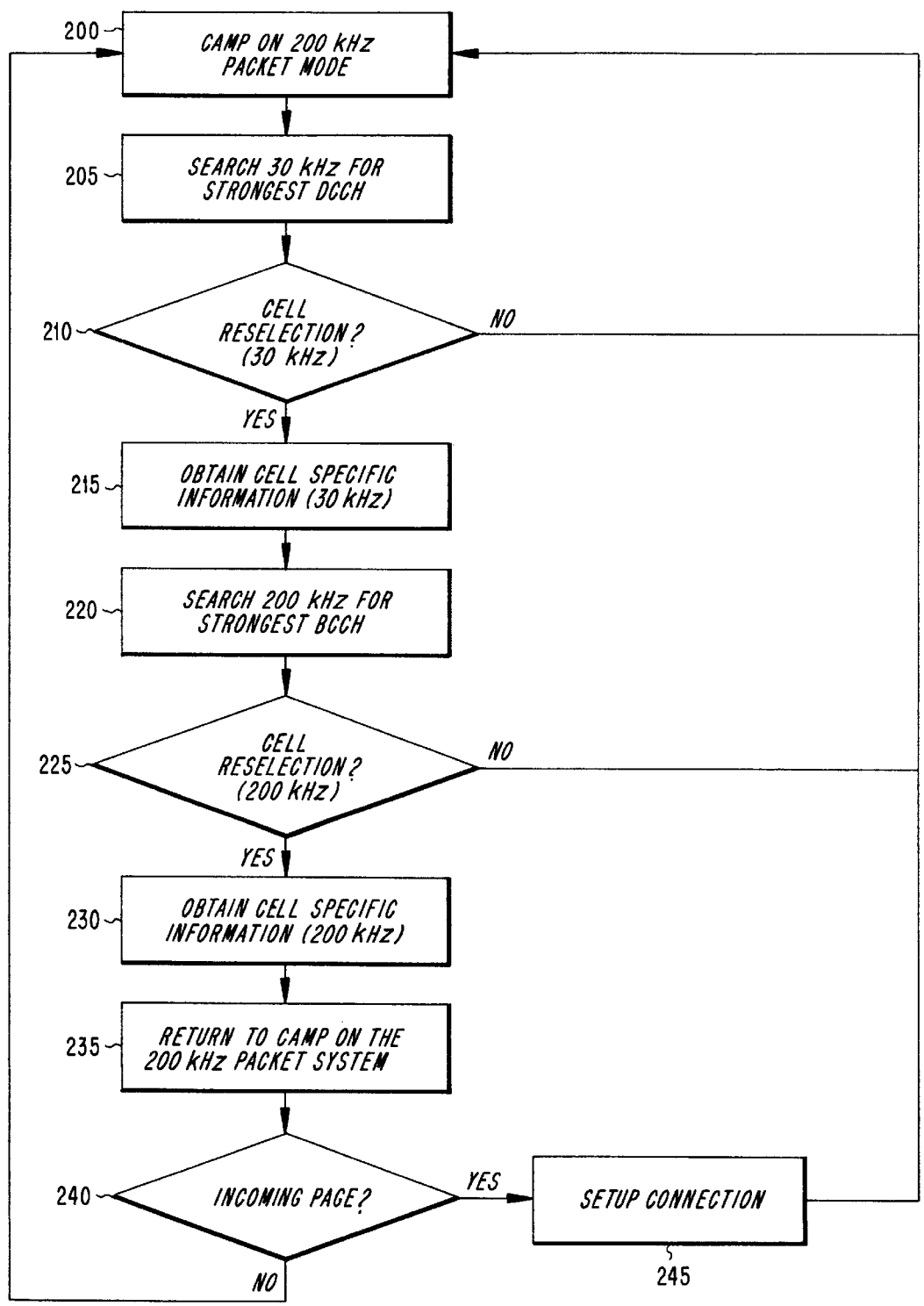
FIG. 2 shows a flow diagram of a process operating in accordance with a second embodiment of the invention.

FIG. 2 shows a flow diagram of a process operating in accordance with a second exemplary embodiment of the invention wherein reselection measurements are performed on the 30 kHz network. At step 200, the MS is initially camped on the 200 kHz network in packet mode. At step 205, the MS performs cell reselection measurements to the 30 kHz control channels in order to select e.g. strongest downlink DCCH. If no cell reselection is needed the MS returns to camping in the 200 kHz packet mode, without performing cell reselection measurements on the 200 kHz network. If a 30 kHz DCCH from a neighboring cell is selected the MS tunes to the selected DCCH and decodes the cell information thereon at step 215. After reading the cell specific information, the MS then scans the 200 kHz carriers and performs measurements to find the strongest BCCH, as shown in step 220. In preparation for a (potential) packet data transfer over the GPRS packet system, the MS then decodes the BCCH to obtain cell specific information (step 230), including information pertaining to the PCCCH or CCCH associated with that particular 200 kHz cell. The MS then returns to camping on the packet control channel in the new cell at step 235. When an incoming page is received (step 240), the MS then switches to the appropriate network to setup the call or packet transfer, as shown in step 245.

In the above second embodiment of the invention the cell reselection procedure is first performed on the 30 kHz network and, if a new serving cell is selected for the 30 kHz network, a search is done on the 200 kHz network. This exemplary technique of performing neighboring cell measurements on the 200 kHz control channels only after cell reselection on the 30 kHz network requires less scanning on the part of the MS than scanning both networks as in the first exemplary embodiment, thereby consuming less power. However, those skilled in the art will also appreciate that being locked to a satisfactory cell in the 30 kHz network may not necessarily mean that the current GPRS cell's control channel provides sufficient quality. In this case, depending on the quality, excessive repeated packet requests may occur or a GPRS cell change, including a search on the 200 kHz network, may be triggered by the network. Accordingly, as an alternative to the embodiments described above, the initial cell reselection procedure may begin as a search on the 200 kHz network, and if a new serving cell selected, the process can then continue with a search on the 30 kHz network.

Figure 3:
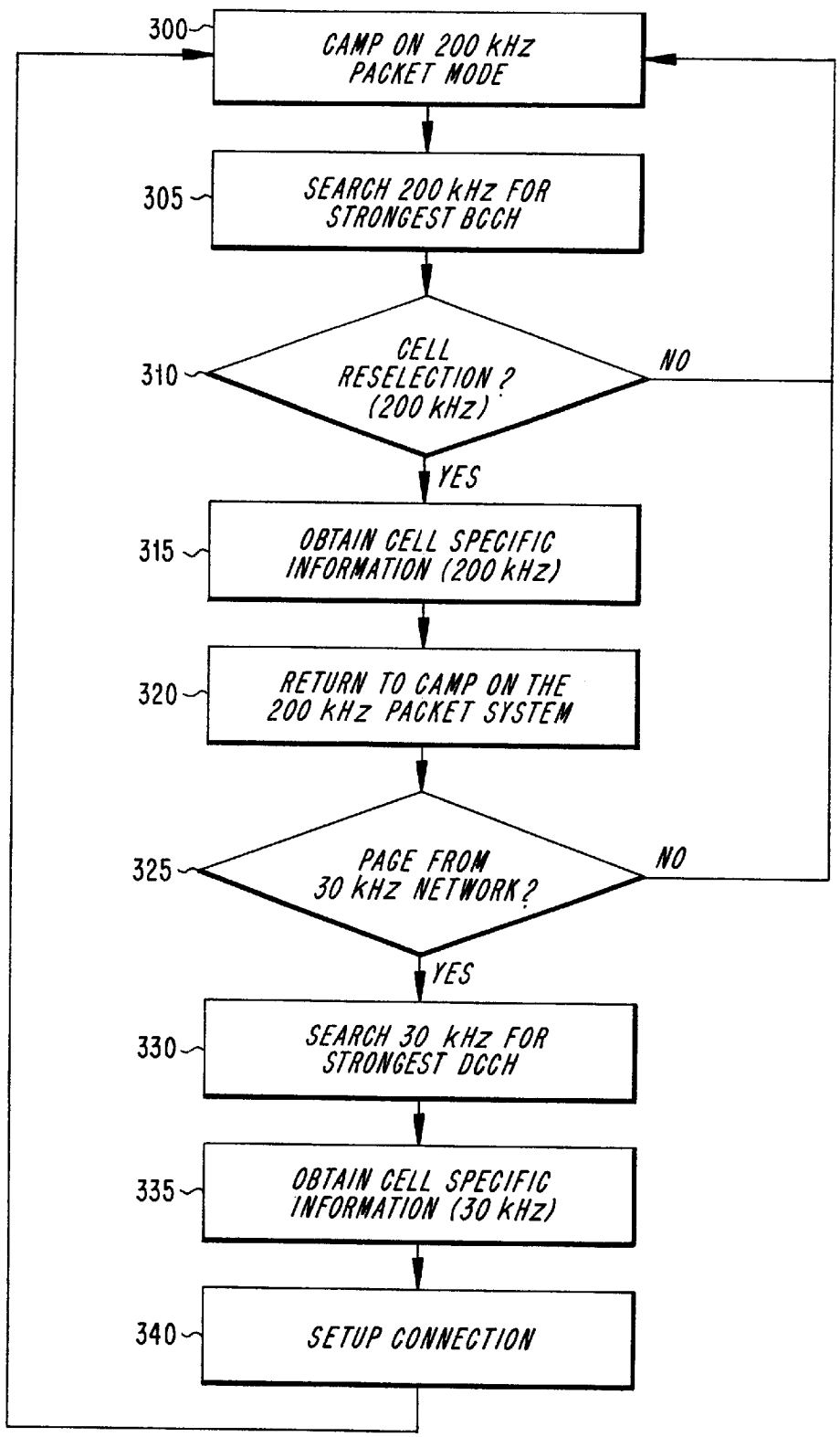
FIG. 3 shows a flow diagram of a process operating in accordance with a third embodiment of the invention.

FIG. 3 is a flow diagram of a process operating in accordance with a third exemplary embodiment of the invention wherein reselection measurements are first performed on the 200 kHz network and, when a page is received on the 30 kHz network, reselection is then performed on that network. Therein, step 300 shows the initial state with the MS camped on the 200 kHz network in packet mode. At steps 305–310, the MS performs cell measurements to select the strongest BCCH on the 200 kHz network. The MS then tunes to and decodes the selected BCCH to obtain cell specific information (step 315) and returns to camp on the packet control channels in the new cell at step 320. If an incoming page is received from the 200 kHz network standard packet transfer setup procedures are performed in accordance with GPRS (not shown). If a page is received from the 30 kHz network (step 325), the MS scans for the strongest 30 kHz DCCH (step 330) which it then selects, tunes to and decodes the cell specific information (step 335), before responding to the page. The MS is now armed with the information necessary to respond to the 30 kHz page and proceeds with setting up the call by performing standard IS-136 procedures, as shown in step 340. At the conclusion of the 30 kHz call, the MS reverts back to camping on 200 kHz packet mode. The technique has the advantage of requiring the MS to only perform measurements on the 200 kHz control channel but may cause an additional delay when responding to a 30 kHz page. However, the technique may be expedited by including a predetermined list of candidate DCCH's contained in the paging message. Furthermore, registration on the 30 kHz network requires that the MS be notified to read the DCCH for the necessary cell information.

Figure 4A:
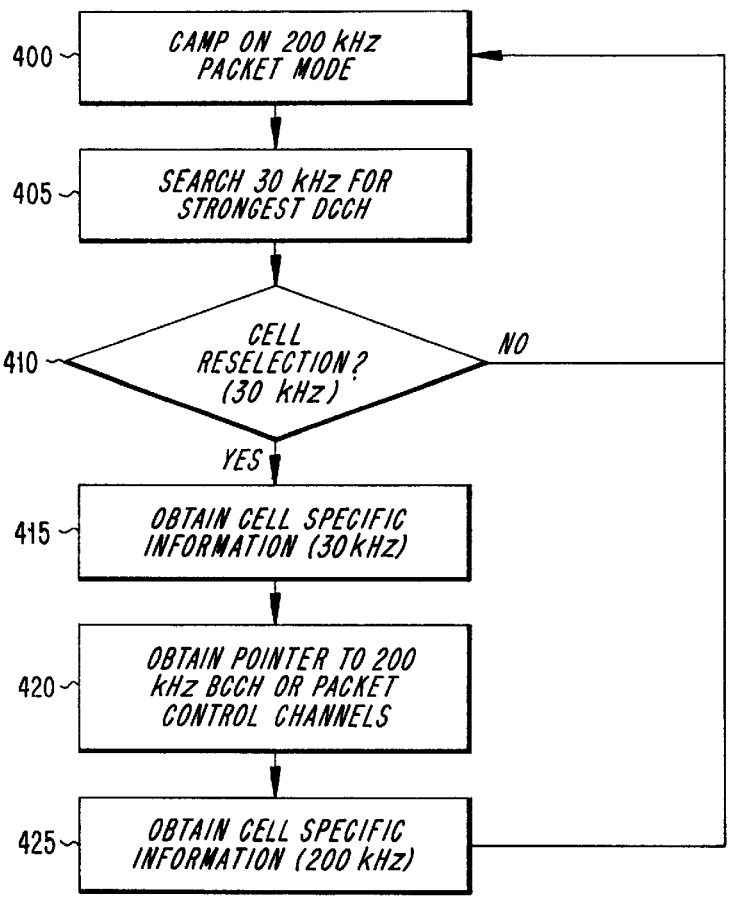
FIG. 4 shows a flow diagram of a process operating in accordance with a fourth embodiment of the invention.

A fourth exemplary embodiment of the present invention involves a system having coordinated cell planning for 30 kHz and 200 kHz networks i.e. a one-to-one cell overlay scheme which avoids some of the problems described above with overlaid packet-switched and circuit-switched cells which are not identical. The resulting situation enables the MS to accurately select an appropriate server for both the 30 kHz circuit-switched network and the 200 kHz packet-switched network using cell reselection measurements on the control channels of either network. FIG. 4a is a flow diagram showing the operation in accordance with one aspect of this fourth exemplary embodiment. Step 400 shows the MS camped in packet mode on the 200 kHz network. The MS then scans for the strongest DCCH by performing cell measurements on the control channels of 30 kHz network, as shown in step 405. If cell reselection is deemed desirable based upon these measurements (step 410), the MS tunes to the identified DCCH and reads the cell information thereon, as shown in step 415. Furthermore, the MS reads a pointer (e.g., frequency or channel number) to the 200 kHz BCCH, PCCCH or CCCH found on the DCCH at step 420. The MS uses this pointer to tune to the BCCH (or other identified channel) and reads cell specific information and then tunes to and camps on the 200 kHz packet control channels, in preparation to an incoming packet page, as shown in step 425. The 200 kHz packet control channels may include either the CCCH or the packet control channel (PCCCH) which are suitable for use with the GPRS system.

Figure 4B:
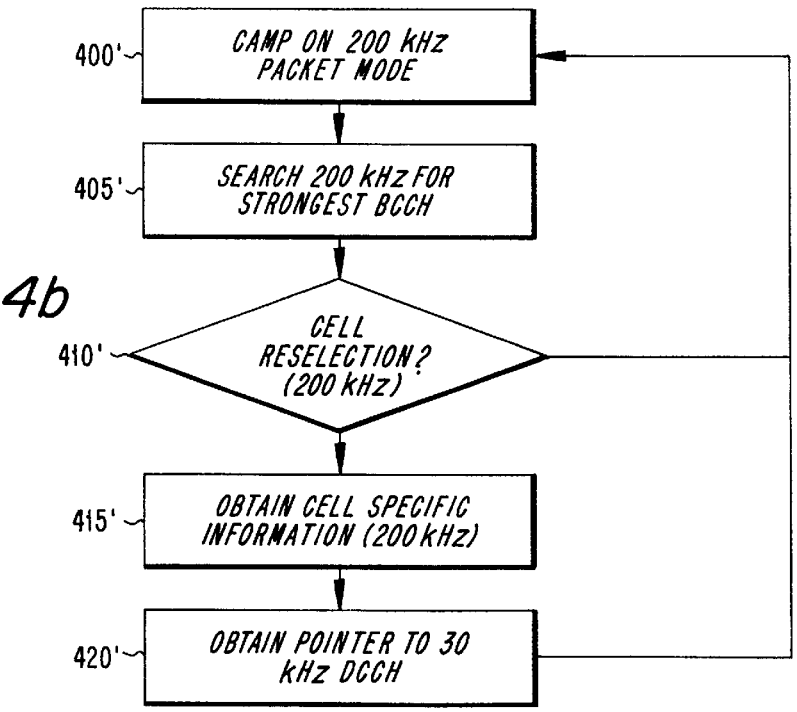

FIG. 4b shows flow diagram of the process operation according to a second exemplary aspect of the fourth embodiment, wherein the MS scans the 200 kHz control channels instead of the 30 kHz channels. Thus, in step 400', the MS initially camps in 200 kHz packet mode. In step 405', the MS scans for the strongest BCCH on the 200 kHz network. If cell reselection is desirable as determined at step 410', then the MS reads the cell information contained on the BCCH (step 415') and obtains a pointer (e.g., a frequency or channel number) to the 30 kHz DCCH in preparation for a 30 kHz page, as shown in step 420'. At this point in the process MS returns to camping on 200 kHz packet control channels. Since all necessary cell information is available either directly or indirectly via the pointers, the MS is equipped to respond to a page from either the 30 kHz or the 200 kHz network. The option of forming coordinated cells is particularly suitable for operators that prefer to upgrade their existing infrastructure in piece-wise manner typically by replacing plug in cards in the base station. Although the invention has been described in some respects with reference to specified preferred embodiments thereof, variations and modifications will become apparent to those skilled in the art. In particular, the invention is not limited to the overlay of the networks operating with the specific frequency bandwidths described. The inventive concept is applicable to networks having other frequency bandwidths such as, for example, overlaying GSM with personal digital cellular (PDC). Moreover, although exemplary cell reselection algorithms are described in terms of strongest received control channels, those skilled in the art will appreciate that the present invention is applicable to any type of reselection algorithm, e.g., those based on other quality measures (e.g., bit error rate) or which include non-quality related parameters, e.g., service type availability. It is therefore, the intention that the following claims not be given a restrictive interpretation but should be viewed to encompass variations and modifications that are derived from the inventive subject matter disclosed.

What is claimed is:

1. In a wireless telecommunication system having an overlaid cell arrangement comprising a first circuit switched network using a first carrier bandwidth operating together with a second packet switched network using a second carrier bandwidth, a method of obtaining cell specific information for a mobile station (MS) camped in one of the bandwidths comprising the steps of:

scanning and tuning to an associated control channel on the first network;

reading cell specific information from said associated control channel on the first network;

scanning and tuning to an associated control channel on the second network; and reading cell specific information from said associated control channel on the second network.

2. A method according to claim 1 wherein said first carrier bandwidth is 30 kHz and the second carrier bandwidth is 200 kHz.

3. A method according to claim 1 wherein said packet switched data service is General Packet Radio Service (GPRS) for use with the Global System for Mobile Communications (GSM).

4. A method according to claim 1 wherein said associated control channel on the first network is a digital control channel (DCCH).

5. A method according to claim 1 wherein said associated control channel on the second network is a broadcast control channel (BCCH).

6. A method according to claim 1 wherein said scanning is performed by taking cell reselection measurements on neighboring control channels.

7. A method according to claim 1 wherein page message from the first network is forwarded to the MS through the packet switched data service network.

8. In a wireless telecommunication system having an overlaid cell arrangement comprising a first network using a first carrier bandwidth operating together with a second network using a second carrier bandwidth, and wherein said system operates to provide both circuit switched service and packet switched data service, a method of responding to a page by a mobile station (MS) camped in packet mode comprising the steps of:

scanning and tuning to a digital control channel (DCCH) on said first network;

reading cell specific information from said DCCH;

scanning and tuning to a broadcast control channel (BCCH) on the second network;

reading BCCH to obtain a pointer to an associated packet control channel on the second network such that said packet control channel is accessed in response to packet switched data service page; and responding to an incoming page.

9. A method according to claim 8 wherein said first carrier bandwidth is 30 kHz and the second carrier bandwidth is 200 kHz.

10. A method according to claim 8 wherein said packet switched data service is General Packet Radio Service (GPRS) specified for use with the Global System for Mobile Communications (GSM).

11. A method according to claim 8 wherein said associated packet control channel is a packet common control channel (PCCCH).

12. A method according to claim 8 wherein page message from the first network are forwarded to the MS through the packet switched data service.

13. In a wireless telecommunication system having an overlaid cell arrangement comprising a first D-AMPS network using a first carrier bandwidth operating together with a second EDGE/GPRS network using a second carrier bandwidth, and wherein said system operates to provide both circuit switched and packet switched data service, a method of obtaining cell specific information by a mobile station (MS) camped in packet mode comprising the steps of:

scanning and tuning to an associated control channel on the second network;

reading cell specific information from said associated control channel on the second network;

scanning and tuning to an associated control channel on the first network in response to a page from the first network; and reading cell specific information from said associated control channel on the first network.

14. A method according to claim 13 wherein said first carrier bandwidth is 30 kHz and the second carrier bandwidth is 200 kHz.

15. A method according to claim 13 wherein said packet switched data service is General Packet Radio Service (GPRS) specified for use with the Global System for Mobile Communications (GSM).

16. A method according to claim 13 wherein said associated control channel on the second network is a broadcast control channel (BCCH).

17. A method according to claim 13 wherein said associated control channel on the first network is a digital control channel (DCCH).

18. In a wireless telecommunication system having a coordinated overlaid cell arrangement comprising a first network using a first carrier bandwidth operating together with a second network using a second carrier bandwidth, and wherein said system operates to provide both circuit switched and packet switched data service, a method of obtaining cell specific information by a mobile station (MS) camped in packet mode comprising the steps of:

scanning and tuning to an associated control channel on either the first network or second network;

reading cell specific information and a pointer to the other network from said associated control channel; and switching to the other network as directed by the pointer, in response to an incoming page from the other network.

19. A method according to claim 18 wherein said first carrier bandwidth is 30 kHz and the second carrier bandwidth is 200 kHz.

20. A method according to claim 18 wherein said packet switched data service is General Packet Radio Service (GPRS specified for use with the Global System for Mobile Communications (GSM).

21. A method according to claim 18 wherein said associated control channel on the first network is a digital control channel (DCCH).

22. A method according to claim 18 wherein said control channel on the second network is a broadcast control channel (BCCH).

* * * * *